United States Patent
Yamasaki et al.

(10) Patent No.: US 11,038,802 B2
(45) Date of Patent: Jun. 15, 2021

(54) IN-VEHICLE APPARATUS, INFORMATION PROCESSING UNIT, INFORMATION PROCESSING METHOD, AND NON-TRANSITORY COMPUTER READABLE STORAGE MEDIUM THAT STORES PROGRAM

(71) Applicant: TOYOTA JIDOSHA KABUSHIKI KAISHA, Toyota (JP)

(72) Inventors: Yasuhiro Yamasaki, Okazaki (JP); Toshio Kawamura, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/106,989

(22) Filed: Aug. 21, 2018

(65) Prior Publication Data

US 2019/0089636 A1 Mar. 21, 2019

(30) Foreign Application Priority Data

Sep. 15, 2017 (JP) .............................. JP2017-177389

(51) Int. Cl.
| | |
|---|---|
| *H04L 12/815* | (2013.01) |
| *H04L 12/927* | (2013.01) |
| *H04L 12/851* | (2013.01) |
| *H04L 12/865* | (2013.01) |
| *H04L 12/875* | (2013.01) |
| *H04L 12/913* | (2013.01) |
| *H04L 12/863* | (2013.01) |

(52) U.S. Cl.
CPC ............. *H04L 47/22* (2013.01); *H04L 47/24* (2013.01); *H04L 47/54* (2013.01); *H04L 47/56* (2013.01); *H04L 47/6275* (2013.01); *H04L 47/724* (2013.01); *H04L 47/805* (2013.01)

(58) Field of Classification Search
CPC ....... H04L 47/22; H04L 47/54; H04L 47/724; H04L 47/805; H04L 47/24; H04L 47/6275; H04L 47/56; H04L 67/12
See application file for complete search history.

(56) References Cited

U.S. PATENT DOCUMENTS

| | | | |
|---|---|---|---|
| 2010/0098104 A1* | 4/2010 | Marshall | H04L 49/254 370/419 |
| 2016/0311423 A1* | 10/2016 | Storm | B60W 20/12 |
| 2017/0142022 A1* | 5/2017 | Bartels | H04L 47/28 |
| 2017/0170951 A1* | 6/2017 | Ito | H04L 12/40143 |

(Continued)

FOREIGN PATENT DOCUMENTS

JP        2009-088823 A        4/2009

*Primary Examiner* — Harry H Kim
(74) *Attorney, Agent, or Firm* — Hunton Andrews Kurth LLP

(57) ABSTRACT

An in-vehicle apparatus includes a processor configured to obtain first transmission data with a first communication address as a destination and second transmission data with a second communication address as a destination from one or more applications, transmit the first transmission data to a relay unit at a first timing among a plurality of timings set at an interval of a predetermined cycle corresponding to a buffer size of the relay unit to which the in-vehicle apparatus is connected, and transmit the second transmission data to the relay unit at a second timing among the plurality of timings, the second timing being different from the first timing.

9 Claims, 4 Drawing Sheets

(56) References Cited

U.S. PATENT DOCUMENTS

| | | | |
|---|---|---|---|
| 2017/0318582 A1* | 11/2017 | Au | H04W 28/0205 |
| 2018/0042011 A1* | 2/2018 | Lim | H04W 72/0446 |
| 2018/0189655 A1* | 7/2018 | Oh | G06F 17/17 |
| 2018/0375736 A1* | 12/2018 | Khanna | H04L 43/028 |
| 2019/0081817 A1* | 3/2019 | Sasaki | H04L 12/46 |
| 2019/0342886 A1* | 11/2019 | Osagawa | H04L 67/12 |
| 2020/0036554 A1* | 1/2020 | Iwata | H04L 12/4625 |

\* cited by examiner

IN-VEHICLE APPARATUS, INFORMATION PROCESSING UNIT, INFORMATION PROCESSING METHOD, AND NON-TRANSITORY COMPUTER READABLE STORAGE MEDIUM THAT STORES PROGRAM

INCORPORATION BY REFERENCE

The disclosure of Japanese Patent Application No. 2017-177389 filed on Sep. 15, 2017 including the specification, drawings and abstract is incorporated herein by reference in its entirety.

BACKGROUND

1. Technical Field

The disclosure relates to an in-vehicle apparatus, an information processing unit, an information processing method, and a non-transitory computer readable storage medium that stores a program.

2. Description of Related Art

In the related art, there has been known a technology in which priority control for determining a transmission order of received packets corresponding to a predetermined condition and bandwidth control for limiting a communication bandwidth in order to improve quality of service (QoS) in a relay unit such as a switch or a router.

For example, a method such as strict priority (Strict) or weighted round robin (WRR) has been known as the priority control. For example, a method such as weighted fair queueing (WFQ), class-based weighted fair queueing (CBWFQ), or shaping has been known as the bandwidth control.

Japanese Unexamined Patent Application Publication No. 2009-088823 (JP 2009-088823 A) discloses a technology in which a card provided within an apparatus buffers data to be transmitted, a switch schedules a transmission chance using the card while reading a retention situation of a buffer within the card, and the card transmits data through the switch according to the scheduling.

SUMMARY

However, in the priority control and the bandwidth control in the relay unit of the related art, there is a possibility of an occurrence of packet loss in the relay unit.

The disclosure provides a technology capable of further reducing a possibility of an occurrence packet loss.

A first aspect of the disclosure relates to an in-vehicle apparatus including a processor configured to obtain first transmission data with a first communication address as a destination and second transmission data with a second communication address as a destination from one or more applications, transmit the first transmission data to a relay unit at a first timing among a plurality of timings set at an interval of a predetermined cycle corresponding to a buffer size of the relay unit to which the in-vehicle apparatus is connected, and transmit the second transmission data to the relay unit at a second timing among the plurality of timings, the second timing being different from the first timing.

According to the first aspect of the disclosure, the in-vehicle apparatus transmits a plurality of transmission data obtained from one or more applications at periodic timings. Accordingly, it is possible to further reduce a possibility of an occurrence of packet loss in the relay unit.

In the in-vehicle apparatus according to the first aspect of the disclosure, the processor may be configured to obtain the first transmission data and the second transmission data within the predetermined cycle.

According to the first aspect of the disclosure, the in-vehicle apparatus transmits the transmission data obtained within one predetermined cycle at periodic timings. Accordingly, it is possible to further reduce a possibility of an occurrence of packet loss.

In the in-vehicle apparatus according to the first aspect of the disclosure, the processor may be configured to obtain the first transmission data from a first application, and obtain the second transmission data from a second application.

According to the first aspect of the disclosure, the in-vehicle apparatus transmits the transmission data obtained from a plurality of applications at periodic timings. Accordingly, it is possible to further reduce a possibility of an occurrence of packet loss even when the data obtained from the applications are transmitted.

In the in-vehicle apparatus according to the first aspect of the disclosure, the processor may be configured to transmit the data to be transmitted at the first timing while limiting a data size, and transmit untransmitted data among a plurality of data included in the first transmission data at a third timing among the timings which is different from the first timing and the second timing.

According to the first aspect of the disclosure, the in-vehicle apparatus divides the transmission data into data each having a predetermined size, and transmits the divided data at periodic timings. Accordingly, it is possible to further reduce a possibility of an occurrence of packet loss even when data each having a relatively large size are transmitted.

In the in-vehicle apparatus according to the first aspect of the disclosure, the processor may be configured to transmit the first transmission data at the first timing when the first transmission data are data which are preferentially relayed by the relay unit. The processor may be configured to transmit the first transmission data at a timing which does not depend on the plurality of timings when the first transmission data are data which are not preferentially relayed by the relay unit.

According to the first aspect of the disclosure, the in-vehicle apparatus immediately transmits data for which the occurrence of packet loss may be allowed in the relay unit without limiting the periodic transmission timing. Accordingly, it is possible to transmit the data for which the occurrence of packet loss is allowed at relatively high speed.

In the in-vehicle apparatus according to the first aspect of the disclosure, the processor may be configured to transmit the data to be transmitted at the first timing while limiting a data size when a classification of the first transmission data is a classification of data which are aperiodically obtained by the processor. The processor may be configured to transmit the data to be transmitted at the first timing without limiting the data size when the classification of the first transmission data is a classification of data which are periodically obtained by the processor.

According to the first aspect of the disclosure, the in-vehicle apparatus transmits control data to be periodically transmitted at the transmission timing at one time. Accordingly, it is possible to transmit the control data to be periodically transmitted at relatively high speed.

A second aspect of the disclosure relates to an information processing unit. The information processing unit includes a processor configured to obtain first transmission data with a first communication address as a destination and second transmission data with a second communication address as a destination from one or more applications, transmit the first transmission data to a relay unit at a first timing among a plurality of timings set at an interval of a predetermined cycle corresponding to a buffer size of the relay unit to which the information processing unit is connected, and transmit the second transmission data to the relay unit at a second timing among the plurality of timings, the second timing being different from the first timing.

A third aspect of the disclosure relates to an information processing method. The information processing method includes causing an information processing unit to obtain first transmission data with a first communication address as a destination and second transmission data with a second communication address as a destination from one or more applications, and causing the information processing unit to transmit the first transmission data to a relay unit at a first timing among a plurality of timings set at an interval of a predetermined cycle corresponding to a buffer size of the relay unit to which the information processing unit is connected, and transmit the second transmission data to the relay unit at a second timing among plurality of the timings, the second timing being different from the first timing.

A fourth aspect of the disclosure relates to a non-transitory computer-readable storage medium that stores a program causing a computer to perform processes. The program causes an information processing unit to perform obtaining first transmission data with a first communication address as a destination and second transmission data with a second communication address as a destination from one or more applications, transmitting the first transmission data to a relay unit at a first timing among a plurality of timings set at an interval of a predetermined cycle corresponding to a buffer size of the relay unit to which the information processing unit is connected, and transmitting the second transmission data to the relay unit at a second timing among the plurality of timings, the second timing being different from the first timing.

According to the aspects of the disclosure, it is possible to further reduce a possibility of an occurrence of packet loss.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the present disclosure will be described with reference to the drawings.

System Configuration

Figure 1:
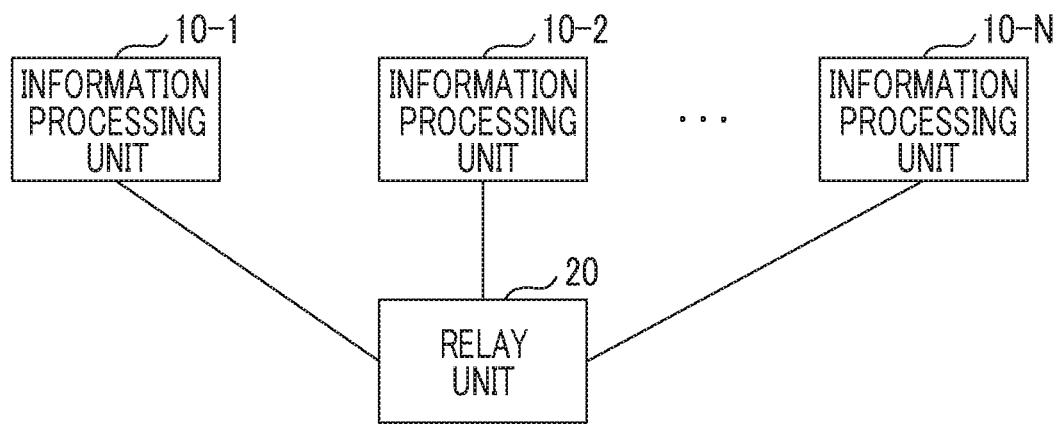
FIG. 1 is a diagram showing a configuration example of an information processing system according to an embodiment.

FIG. 1 is a diagram showing a configuration example of an information processing system 1 according to an embodiment. In FIG. 1, the information processing system 1 includes information processing unites 10-1, 10-2, . . . , and 10-N (hereinafter, simply referred to as an "information processing unit 10" when it is not necessary to distinguish between these devices), and a relay unit 20. The information processing system 1 may include a plurality of relay unites 20.

For example, the information processing unites 10-1, 10-2, . . . , and 10-N are connected by a network such as an in-vehicle local area network (LAN), a LAN, a wireless LAN, the Internet, or a mobile phone network such as Long-Term Evolution (LTE) to 5th-Generation (5G) through at least one or more relay unites 20.

Hereinafter, an in-vehicle system in which an in-vehicle apparatus as an example of the information processing unit 10 is connected by the in-vehicle LAN will be described as an example. However, the disclosed technology is applicable to various machines in various network systems such as networks for controlling machines in factories and the Internet of Things (IoT) system that connects sensors to a cloud.

For example, the information processing unit 10 is an in-vehicle apparatus such as a sensor or a vehicular electronic control unit (ECU).

Hardware Configuration

Figure 2:
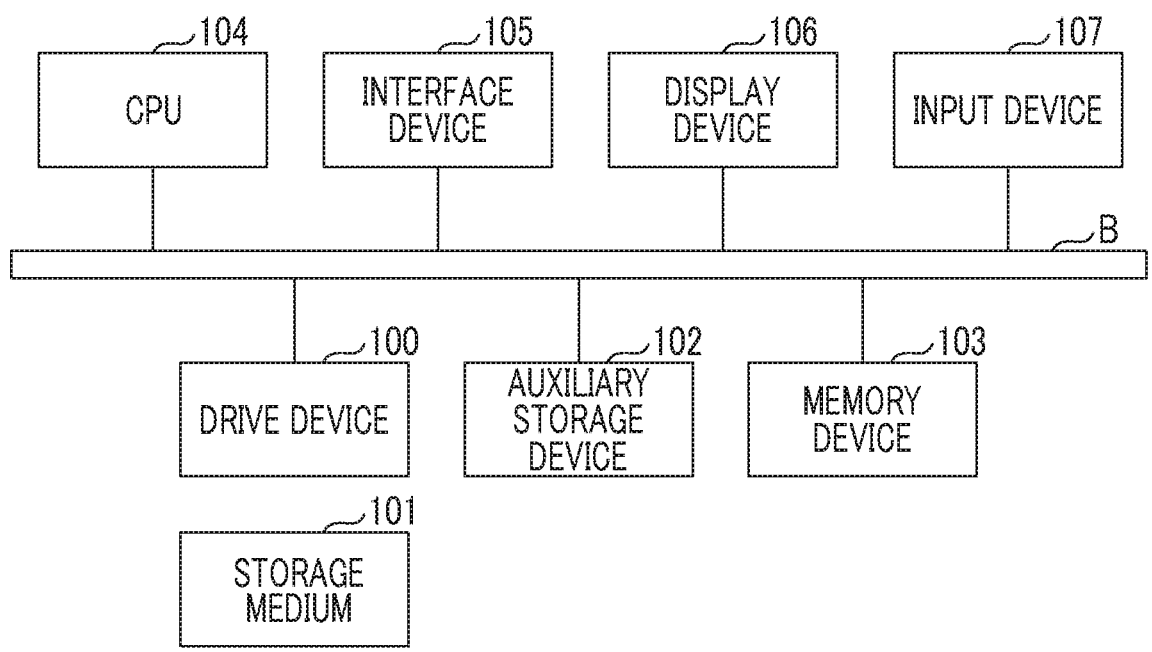
FIG. 2 is a diagram showing a hardware configuration example of an information processing unit according to the embodiment.

FIG. 2 is a diagram showing a hardware configuration example of the information processing unit 10 according to the embodiment. The information processing unit 10 of FIG. 2 includes a drive device 100, an auxiliary storage device 102, a memory device 103, a central processing unit (CPU) 104, and an interface device 105, which are connected to each other through a bus B.

For example, an information processing program that realizes processes in the information processing unit 10 is provided by a storage medium 101. When the storage medium 101 that records the information processing program is set in the drive device 100, the information processing program is installed on the auxiliary storage device 102 from the storage medium 101 through the drive device 100. Here, the information processing program does not need to be installed from the storage medium 101 and may be downloaded from another computer via a network. The auxiliary storage device 102 stores the installed information processing program, and also stores needed files or data.

For example, the memory device 103 is a random-access memory (RAM), and reads out the program from the auxiliary storage device 102 and stores the readout program when an instruction to activate the program is received. The CPU 104 realizes functions related to the information processing unit 10 according to the program stored in the memory device 103. The interface device 105 is used as an interface for being connected to the network.

As the storage medium 101, there is a portable storage medium such as a compact disc read-only memory (CD-ROM), a digital versatile disc (DVD), or a universal serial bus (USB) memory. As an example of the auxiliary storage device 102, there is a hard disk drive (HDD) or a flash memory. Both the storage medium 101 and the auxiliary storage device 102 correspond to a computer-readable storage medium.

Functional Configuration

Figure 3:
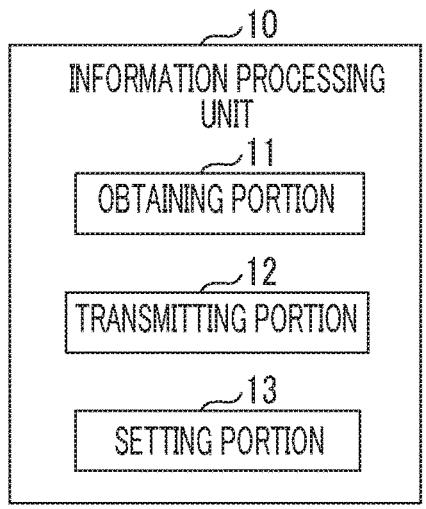
FIG. 3 is a diagram showing an example of a functional block of the information processing unit according to the embodiment.

The functional configuration of the information processing unit 10 according to the embodiment will be described with reference to FIG. 3. FIG. 3 is a diagram showing an example of the functional block diagram of the information processing unit 10 according to the embodiment. The information processing unit 10 includes an obtaining portion 11, a transmitting portion 12, and a setting portion 13. The obtaining portion 11, the transmitting portion 12, and the setting portion 13 represent the functions realized by one or more programs installed on the information processing unit 10 causing the CPU 104 of the information processing unit 10 to perform the processes.

The obtaining portion 11 obtains the designation of a transport protocol to be used, a communication address of a destination, and transmission data from one or more applications that operate on the information processing unit 10. For example, as the transport protocol to be used, the Transmission Control Protocol (TCP) and the User Datagram Protocol (UDP) are designated. For example, an Internet Protocol (IP) address and a port number are included in the communication address.

The transmitting portion 12 transmits the transmission data obtained by the obtaining portion 11 to the communication address of the destination by using the transport protocol designated to the application through the relay unit 20 at periodic transmission timing at a predetermined cycle set by the setting portion 13.

The setting portion 13 sets a cycle ("predetermined cycle") with which the data is transmitted by the transmitting portion 12 which is set in advance depending on a buffer size of the relay unit 20 and an upper limit of a data size. The setting portion 13 may perform setting in response to an operation of a user or may perform setting according to a command received from an external apparatus through the relay unit 20.

Processes

Processes of when Request for Transmission is Received from Application

Figure 4:
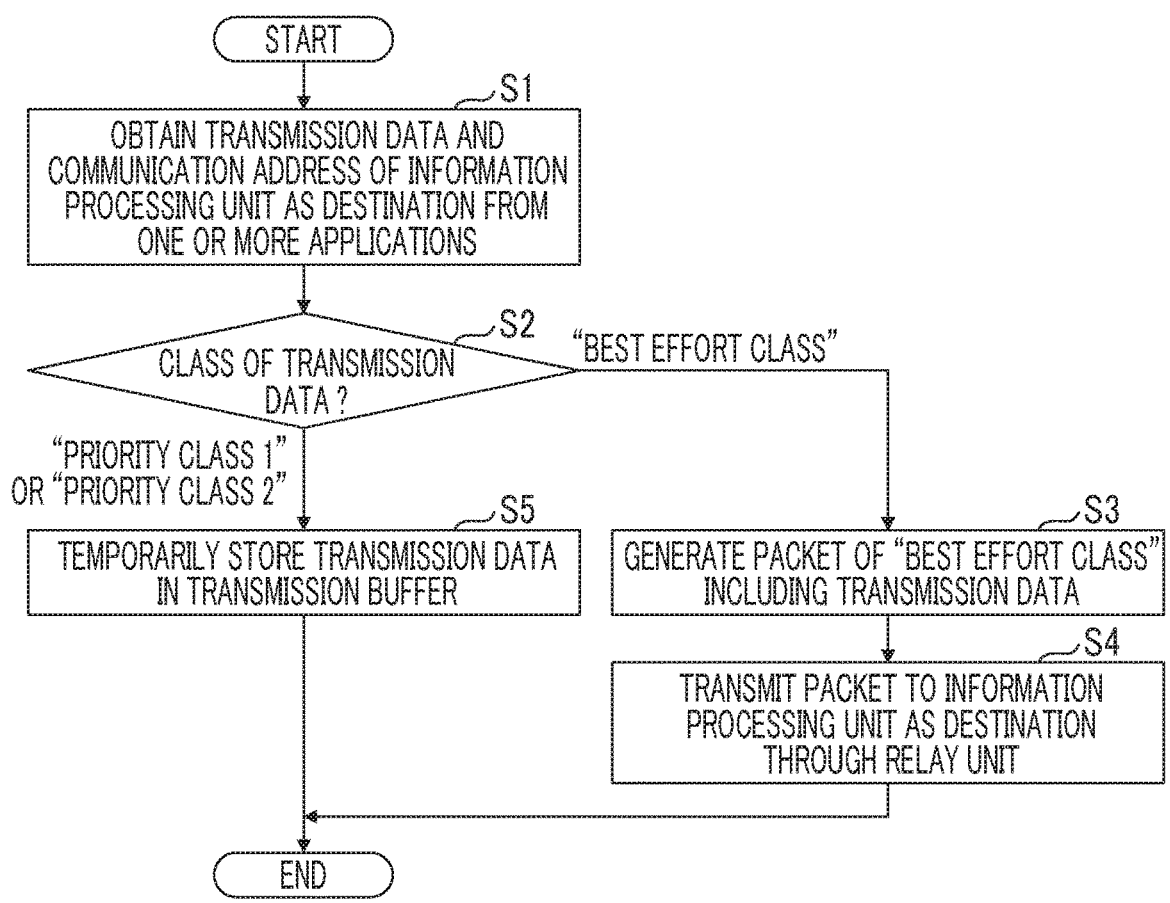
FIG. 4 is a flowchart showing an example of processes of when a request for transmission is received from an application of the information processing unit according to the embodiment.

Processes of when a request for transmission is received from the application of the information processing unit 10 according to the embodiment will be described with reference to FIG. 4. FIG. 4 is a flowchart showing an example of the processes of when the request for transmission is received from the application of the information processing unit 10 according to the embodiment.

The information processing unit 10 may be requested to transmit a plurality of data from one or a plurality of applications which operates on the information processing unit 10 within a predetermined cycle (for example, 4 ms) set in advance by the setting portion 13. In this case, the communication addresses of the destinations or the transport protocols to be used may be different or may be the same for the data. For example, the applications include an application for realizing a main function (main mechanism) in the information processing unit 10 such as transmission of data measured by the sensor. The applications may include an application for an alive monitoring of the information processing unit 10 and an application for updating software of the information processing unit 10.

In step S1, the obtaining portion 11 obtains the transmission data, the communication address of the information processing unit 10 as the destination and the designation of the transport protocol to be used from one or more applications that operate on the information processing unit 10. For example, a function for transmission which is included in an application programming interface (API) for data communication provided by an operating system (OS) is executed by the one or more applications.

Subsequently, the transmitting portion 12 determines a class of the obtained transmission data (step S2). For example, the class of the transmission data may be set in advance by the one or more applications. In this case, the application may designate the class of the transmission data by executing a predetermined API, for example.

For example, the class of the transmission data includes "priority class 1", "priority class 2", and "best effort class". For example, "priority class 1" may be used for control information (an example of a "periodically obtained data transmitted with a predetermined (fixed) data size at a predetermined (fixed) cycle (for example, one second).

For example, "priority class 2" may be used for information (an example of an "aperiodically obtained data") transmitted with an unfixed data size in response to an event such as an operation of the user. For example, "best effort class" may be used for a data for which packet loss is allowed.

When the class is "best effort class" ("best effort class" in step S2), the transmitting portion 12 generates a packet of "best effort class" including the obtained transmission data (step S3). Here, the transmitting portion 12 may transmit a packet to which a packet priority is set by using a 3-bit class of service (CoS) field included in an Ethernet header. Alternatively, the transmitting portion 12 may generate a packet to which the packet priority is set by using a predetermined field of an IP header according to a QoS protocol such as type of service (ToS) or differentiated services (DiffServ).

Thereafter, the transmitting portion 12 transmits the packet to the information processing unit 10 as the destination from a transmission buffer of the information processing unit 10 through the relay unit 20 (step S4), and ends the process. For example, as described above, the packet loss may occur in a data other than the control data, a data desired to be transmitted at high speed may be transmitted with no limitations on a bandwidth or limitations on smoothing (periodization) of the transmission timing as long as there is an available bandwidth in the network.

Meanwhile, when the class is "priority class 1" or "priority class 2" ("priority class 1" or "priority class 2" in step S2), the transmitting portion 12 temporarily stores the obtained transmission data in the transmission buffer (step S5), and ends the process. For example, the transmission buffer may be a transmission buffer of a network interface card (NIC) which is the interface device 105.

Processes of when Transmission Timing has Come

Figure 5:
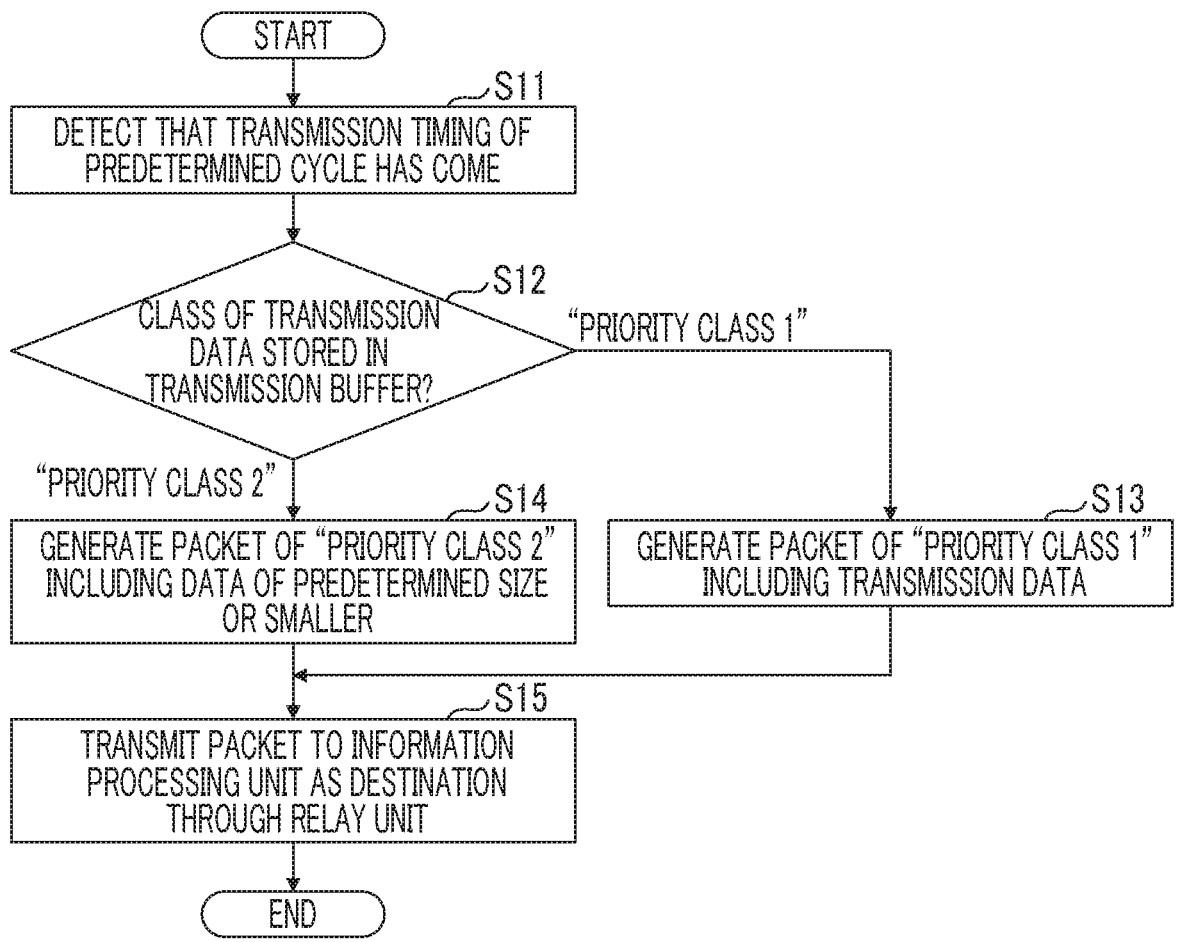
FIG. 5 is a flowchart showing an example of processes of when a periodic transmission timing of the information processing unit according to the embodiment has come.

Processes of when a periodic transmission timing of the information processing unit 10 according to the embodiment has come will be described with reference to FIG. 5. FIG. 5 is a flowchart showing an example of the processes of when the transmission timing of the information processing unit 10 according to the embodiment.

In step S11, the transmitting portion 12 detects that the periodic transmission timing with a predetermined cycle set in advance by the setting portion 13 has come.

Subsequently, the transmitting portion 12 determines the class of the oldest transmission data among the transmission data stored in the transmission buffer (step S12). Here, when a request for transmission of a data of "priority class 1" or "priority class 2" is received from the applications that operate on the information processing unit 10 within one cycle of the predetermined cycle set in advance, the transmission data are stored in the transmission buffer. When the transmission data is not stored in the transmission buffer at the current transmission timing, the data is not transmitted at the current transmission timing.

When the class is "priority class 1" ("priority class 1 in step S12), the transmitting portion 12 generates a packet of "priority class 1" including the transmission data (step S13), and proceeds to the process of step S15. Here, when the class is "priority class 1", the transmitting portion 12 may not limit the size of the data to be transmitted at the current transmission timing. By doing this, when "priority class 1" is used for the information transmitted with the fixed data size at the fixed cycle, even though the data of "priority class 1" is transmitted from the information processing unit 10 at any timing, the packet loss does not occur by using the relay unit 20 having a buffer with a sufficient size.

When the class is "priority class 2" ("priority class 2" in step S12), the transmitting portion 12 generates a packet of "priority class 2" including a data having a predetermined size or smaller set in advance by the setting portion 13 (step S14). For example, the size (for example, the fixed size of the transmission data used by "priority class 1") of the periodic transmission data in the information processing unit 10 may be set as the predetermined size. When the size of the transmission data is larger than the predetermined size set in advance, the transmitting portion divides the transmission data into a plurality of data such that the transmission data has the predetermined size set in advance or smaller, and generates packets which include the divided data. An untransmitted data among the divided data which is not transmitted at the current transmission timing is transmitted at the subsequent transmission timing.

In step S13 and step S14, the transmitting portion 12 generates the packet to which the packet priority is set according to the QoS protocol such as Cos, ToS, or DiffServ, similarly to the process of step S3.

Thereafter, the transmitting portion 12 transmits the generated packets to the information processing unit 10 as the destination through the relay unit 20 (step S15), and ends the process.

When the transmission data from the applications are stored in the transmission buffer at the current transmission timing, a transmission data among the transmission data which is not transmitted at the current transmission timing (an example of "first timing") is transmitted at the subsequent transmission timing (an example of "second timing"). It is assumed that a transmission data from one application is stored in the transmission buffer and the size of the transmission data is larger than the predetermined size set in advance by the setting portion 13. In this case, the transmitting portion 12 transmits a data having the upper limit size among the transmission data at the current transmission timing (an example of "first timing"), and transmits an untransmitted data among the transmission data at the subsequent transmission timing (an example of "third timing").

Modification Example

In step S12 and step S15, the transmitting portion 12 may transmit the transmission data stored in the transmission buffer in an order corresponding to a predetermined condition instead of transmitting the transmission data in ascending order by time. For example, the transmitting portion 12 sets the predetermined condition as a condition in which the priority of "priority class 1" is higher than the priority of "priority class 2", and determines the transmission order by strict priority or WRR.

In the case of the strict priority, when the transmission data of "priority class 1" and the transmission data of "priority class 2" are present in the transmission buffer, the transmitting portion 12 transmits the transmission data of "priority class 1" in preference to the transmission data of "priority class 2". For example, as stated above, in the information processing unit 10, it is possible to transmit the control data to which "priority class 1 is set at the fixed cycle in preference to the data to which "priority class 2 is set and which corresponds to the event.

Figure 6A:
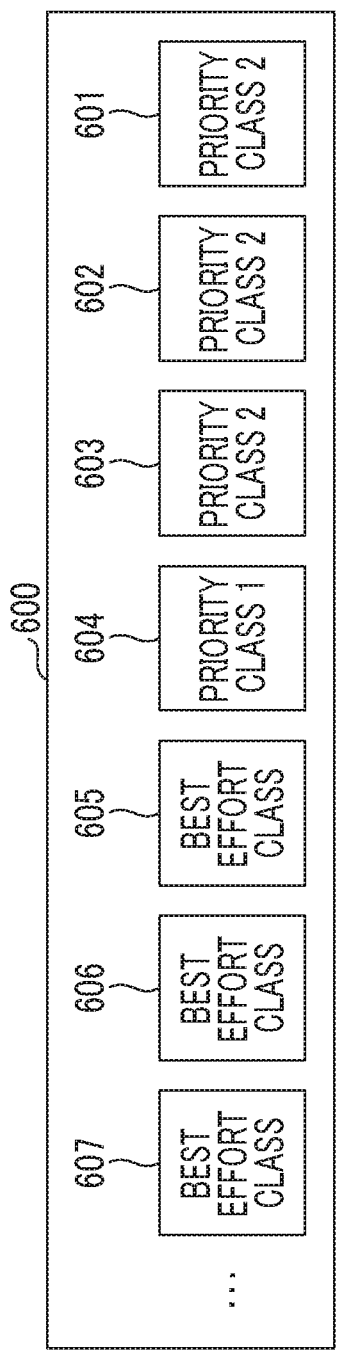
FIG. 6A is a diagram for describing an order in which data are transmitted.
Figure 6B:
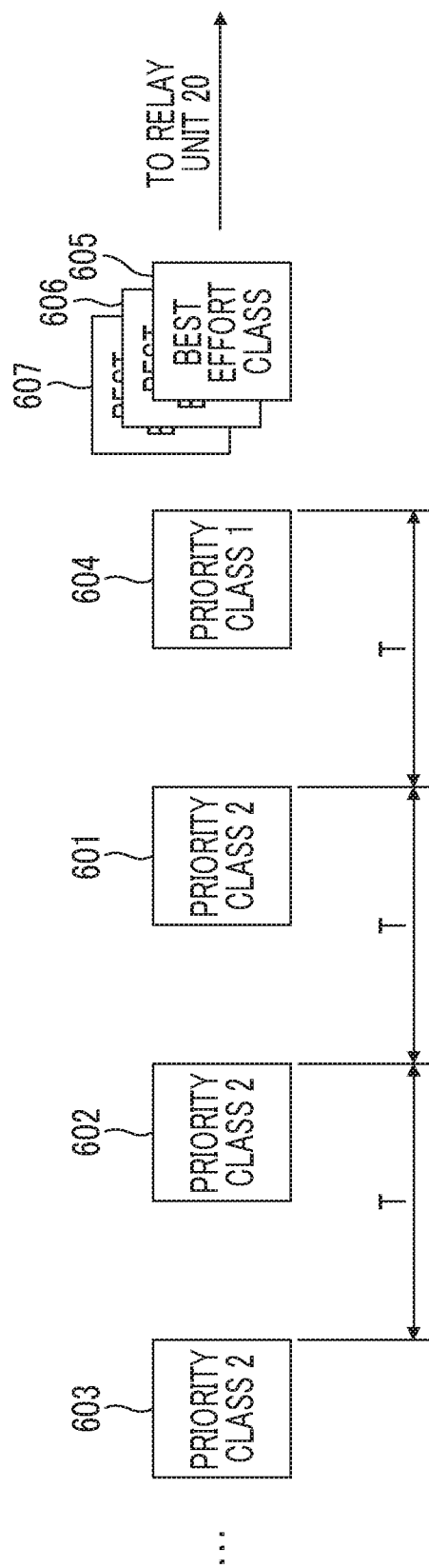
FIG. 6B is a diagram for describing the order in which the data are transmitted.

FIGS. 6A and 6B are diagrams for describing the order in which the data are transmitted. In the example of FIG. 6A, transmission data 601 to 607 are stored in a transmission buffer 600 of the information processing unit 10 in ascending order of the data obtained by the obtaining portion 11 by time. Here, it is assumed that the transmission data 601 to 603 are "priority class 2", the transmission data 604 is "priority class 1", and the transmission data 605 to 607 are "best effort class". In this case, as shown in FIG. 6B, the transmission data 605 to 607 of "best effort class" are immediately transmitted from the information processing unit 10.

When the transmitting portion 12 sets the priority of "priority class 1" to be higher than the priority of "priority class 2" and determines the transmission order by the strict priority, the transmission data 604 of "priority class 1" is transmitted at a transmission timing of a predetermined cycle T set in advance by the setting portion 13. Thereafter, the transmission data 601 to 603 of "priority class 2" are transmitted at the transmission timing of the predetermined cycle T.

Relay Unit 20

Hereinafter, the relay unit 20 will be described. The relay unit 20 according to the embodiment is a switch or a router that supports the QoS function such as CoS, ToS, or DiffServ.

In the in-vehicle system, a communication bandwidth of the information transmitted with "priority class 1" with the fixed data size at the fixed cycle from each information processing unit 10 may be calculated based on a design specification or actual measurement.

As in the embodiment, a maximum value of the communication bandwidth of the data to be transmitted with "priority class 2" may be calculated by setting the transmission timing of the data to be transmitted with "priority class 2" from each information processing unit 10 to be the predetermined cycle and limiting the size of the data to be transmitted at one time.

As stated above, the communication bandwidths to be allocated to "priority class 1" and "priority class 2" may be determined such that the packet loss for the packets of "priority class 1" and "priority class 2" does not occur in the relay unit 20, and may be set to the relay unit 20.

For example, it is assumed that the number of information processing unites 10 that transmit the packets of "priority class 1" and "priority class 2" is ten. It is assumed that the maximum value of the data (a payload of an Ethernet frame) to be transmitted at one time from each information processing unit 10 is set to be 1.5 KB by the setting portion 13. It is assumed that the predetermined cycle at which the packets of "priority class 1" and "priority class 2" are transmitted from each information processing unit 10 is set to be 4 ms by the setting portion 13.

In this case, in the relay unit 20, the communication bandwidth allocated to "priority class 1" and "priority class 2" is set to be 30 Mbps (=1.5 KB×8 bits×10/4 ms) or more. It is assumed that the transmission buffer size for the packets of "priority class 1" and "priority class 2" set to output ports of the relay unit 20 is set to be 13.5 KB (=1.5 KB×(10−1)).

As stated above, it is possible to realize the communication system in which the packet loss of the packets of "priority class 1" and "priority class 2" does not occur in the relay unit 20.

Conclusion

According to the embodiment, the information processing unit on a transmission side transmits the transmission data obtained from the one or more applications at the predetermined cycle set in advance. As described above, it is possible to further reduce a possibility of an occurrence of packet loss.

While the embodiment of the present disclosure has been described, the present disclosure is not limited to the specific embodiment. It is to be appreciated that the embodiment may be variously changed and modified without departing from the scope of the present disclosure described in the claims.

The function of the transmitting portion 12 may be mounted on a program that performs communication in a layer such as a data link layer. In this case, at least a part of the program may be mounted by, for example, a driver of the NIC. The program may be handled by the operating system (OS), and may be installed on the information processing unit 10.

The function of the transmitting portion 12 may be mounted in a program that performs communication in a layer such as a transport layer or an application layer.

The data of "priority class 1" or "priority class 2" is an example of a "data which is preferentially relayed by the relay unit". The data of "best effort class" is an example of a "data which is not preferentially relayed by the relay unit".

What is claimed is:

1. An in-vehicle apparatus comprising a processor configured to:
    obtain first transmission data, a first designation of a transport protocol, and a first designation communication address, and second transmission data, a second designation of the transport protocol, and a second designation communication address from one or more applications;
    transmit the first transmission data to the first designation communication address through a relay unit at a first timing among a plurality of timings set at an interval of a predetermined cycle corresponding to a buffer size of the relay unit to which the in-vehicle apparatus is connected;
    transmit the second transmission data to the second designation communication address through the relay unit at a second timing among the plurality of timings, the second timing being different from the first timing; and
    set a maximum data size for the first transmission data and the second transmission data,
    wherein a communication bandwidth of the relay unit allocated to the first transmission data and the second transmission data is determined based on the predetermined cycle and the maximum data size, and
    wherein the processor is configured to
        transmit the first transmission data to be transmitted at the first timing while limiting the first transmission data to be transmitted to the maximum data size when a classification of the first transmission data is a classification of data which are aperiodically obtained by the processor, and
        transmit the first transmission data to be transmitted at the first timing without limiting the first transmission data to be transmitted to the maximum data size when the classification of the first transmission data is a classification of data which are periodically obtained by the processor.

2. The in-vehicle apparatus according to claim 1, wherein the processor is configured to obtain the first transmission data and the second transmission data within the predetermined cycle.

3. The in-vehicle apparatus according to claim 1, wherein the processor is configured to obtain the first transmission data from a first application, and obtain the second transmission data from a second application.

4. The in-vehicle apparatus according to claim 1, wherein the processor is configured to
    transmit the data to be transmitted at the first timing while limiting the data to be transmitted to the maximum data size, and
    transmit untransmitted data among a plurality of data included in the first transmission data at a third timing among the timings which is different from the first timing and the second timing.

5. The in-vehicle apparatus according to claim 1, wherein the processor is configured to
    transmit the first transmission data at the first timing when the first transmission data are data which are preferentially relayed by the relay unit, and
    transmit the first transmission data at a timing which does not depend on the plurality of timings when the first transmission data are data which are not preferentially relayed by the relay unit.

6. An information processing unit comprising a processor configured to:
    obtain first transmission data, a first designation of a transport protocol, and a first designation communication address, and second transmission data, a second designation of the transport protocol, and a second designation communication address from one or more applications;
    transmit the first transmission data to the first designation communication address through a relay unit at a first timing among a plurality of timings set at an interval of a predetermined cycle corresponding to a buffer size of the relay unit to which the information processing unit is connected;
    transmit the second transmission data to the second designation communication address through the relay unit at a second timing among the plurality of timings, the second timing being different from the first timing; and
    set a maximum data size for the first transmission data and the second transmission data,
    wherein a communication bandwidth of the relay unit allocated to the first transmission data and the second transmission data is determined based on the predetermined cycle and the maximum data size, and
    wherein the processor is configured to
        transmit the first transmission data to be transmitted at the first timing while limiting the first transmission data to be transmitted to the maximum data size when a classification of the first transmission data is a classification of data which are aperiodically obtained by the processor, and
        transmit the first transmission data to be transmitted at the first timing without limiting the first transmission data to be transmitted to the maximum data size when the classification of the first transmission data is a classification of data which are periodically obtained by the processor.

7. An information processing method comprising:
causing an information processing unit to obtain first transmission data, a first designation of a transport protocol, and a first designation communication address, and second transmission data, a second designation of the transport protocol, and a second designation communication address from one or more applications; and
causing the information processing unit to transmit the first transmission data to the first designation communication address through a relay unit at a first timing among a plurality of timings set at an interval of a predetermined cycle corresponding to a buffer size of the relay unit to which the information processing unit is connected, transmit the second transmission data to the second designation communication address through the relay unit at a second timing among the plurality of timings, the second timing being different from the first timing, and
set a maximum data size for the first transmission data and the second transmission data,
wherein a communication bandwidth of the relay unit allocated to the first transmission data and the second transmission data is determined based on the predetermined cycle and the maximum data size, and
wherein the method further comprising causing the information processing unit to
transmit the first transmission data to be transmitted at the first timing while limiting the first transmission data to be transmitted to the maximum data size when a classification of the first transmission data is a classification of data which are aperiodically obtained by the information processing unit, and
transmit the first transmission data to be transmitted at the first timing without limiting the first transmission data to be transmitted to the maximum data size when the classification of the first transmission data is a classification of data which are periodically obtained by the information processing unit.

8. A non-transitory computer-readable storage medium storing a program causing a computer to perform processes,
wherein the program causes an information processing unit to perform obtaining first transmission data, a first designation of a transport protocol, and a first designation communication address, and second transmission data, a second designation of a transport protocol, and a second designation communication address from one or more applications,
transmitting the first transmission data to the first designation communication address through a relay unit at a first timing among a plurality of timings set at an interval of a predetermined cycle corresponding to a buffer size of the relay unit to which the information processing unit is connected,
transmitting the second transmission data to the second designation communication address through the relay unit at a second timing among the plurality of timings, the second timing being different from the first timing, and setting a maximum data size for the first transmission data and the second transmission data,
wherein a communication bandwidth of the relay unit allocated to the first transmission data and the second transmission data is determined based on the predetermined cycle and the maximum data size, and
wherein the program further causes the information processing unit to perform
transmitting the first transmission data to be transmitted at the first timing while limiting the first transmission data to be transmitted to the maximum data size when a classification of the first transmission data is a classification of data which are aperiodically obtained by the information processing unit, and
transmitting the first transmission data to be transmitted at the first timing without limiting the first transmission data to be transmitted to the maximum data size when the classification of the first transmission data is a classification of data which are periodically obtained by the information processing unit.

9. The in-vehicle apparatus according to claim 1, wherein there are a plurality of in-vehicle apparatuses and a relay unit which relays communications between the in-vehicle apparatuses.

* * * * *